(12) United States Patent
Lecomte et al.

(10) Patent No.: US 8,270,598 B2
(45) Date of Patent: Sep. 18, 2012

(54) HIGHLY SECURED METHOD AND DEVICE FOR DISTRIBUTING AUDIO-VISUAL STREAMS

(75) Inventors: Daniel Lecomte, Paris (FR); Charles-Emile Grondin, Sarcelles (FR)

(73) Assignee: Querell Data Limited Liability Company, Dover, DE (US)

( * ) Notice: Subject to any disclaimer, the term of this patent is extended or adjusted under 35 U.S.C. 154(b) by 1494 days.

(21) Appl. No.: 10/592,968

(22) PCT Filed: Mar. 16, 2005

(86) PCT No.: PCT/FR2005/000636
§ 371 (c)(1),
(2), (4) Date: Oct. 31, 2006

(87) PCT Pub. No.: WO2005/101847
PCT Pub. Date: Oct. 27, 2005

(65) Prior Publication Data
US 2007/0165842 A1     Jul. 19, 2007

(30) Foreign Application Priority Data

Mar. 16, 2004     (FR) ..................................... 04 50521

(51) Int. Cl.
*H04K 1/00* (2006.01)
*H04L 9/00* (2006.01)
*H04N 7/16* (2006.01)
*H04L 9/32* (2006.01)

(52) U.S. Cl. .......... 380/28; 713/168; 380/268; 380/201; 380/210; 380/255; 725/1

(58) Field of Classification Search ............... 713/168; 380/201–210, 217, 223–224
See application file for complete search history.

(56) References Cited

U.S. PATENT DOCUMENTS

| | | | |
|---|---|---|---|
| 5,953,506 A * | 9/1999 | Kalra et al. ................ 709/231 |
| 6,233,356 B1 * | 5/2001 | Haskell et al. ............ 382/243 |
| 6,351,538 B1 | 2/2002 | Uz | |
| 6,606,095 B1 * | 8/2003 | Lengyel et al. ........... 345/473 |
| 6,614,843 B1 * | 9/2003 | Gordon et al. ......... 375/240.01 |
| 7,062,096 B2 * | 6/2006 | Lin et al. ................... 382/232 |
| 7,382,969 B2 * | 6/2008 | Dawson ....................... 386/94 |
| 2004/0221192 A1 * | 11/2004 | Motta et al. .................. 714/8 |
| 2004/0230799 A1 * | 11/2004 | Davis ........................ 713/169 |
| 2005/0139657 A1 * | 6/2005 | Hopkins .................. 235/382.5 |

FOREIGN PATENT DOCUMENTS
FR    2 843 517 A    2/2004
WO    WO 03/007608 A1    1/2003
* cited by examiner

*Primary Examiner* — Nathan Flynn
*Assistant Examiner* — Trang Doan
(74) *Attorney, Agent, or Firm* — Connolly Bove Lodge & Hutz LLP

(57) ABSTRACT

A process for distributing audiovisual sequences may involve generating a modified main stream from an audiovisual sequence as well as complementary information that may enable equipment receiving the modified main stream and the complementary information to synthesize the audiovisual sequence. The modified main stream and the complementary information may be separately transmitted to the equipment.

45 Claims, 3 Drawing Sheets

Stream containing some random and pseudo random elements
2a
Stream containing only random elements
2b
 Seed which generates an element of a pseudo random sequence, representing a random element
 Position: pseudo random element
 Element of the stream: random element

HIGHLY SECURED METHOD AND DEVICE FOR DISTRIBUTING AUDIO-VISUAL STREAMS

RELATED APPLICATION

This is a §371 of International Application No. PCT/FR2005/000636, with an international filing date of Mar. 16, 2005 (WO 2005/101847 A1, published Oct. 27, 2005), which is based on French Patent Application No. 04/50521, filed Mar. 16, 2004.

TECHNICAL FIELD

This disclosure relates to the area of the highly secure distribution of digital audiovisual sequences.

U.S. Pat. No. 6,351,538 discloses protection of a digital video stream. The protection is applied when the video stream is in the process of being digitized. The digital video stream is considered as being composed of a stream of video images coded by compensation of movement and a second stream of video image called a "reference" and serving to predict movement. The reference stream of video images is encrypted and the quantity of data to be encrypted to protect the stream is therefore reduced. The parameters that permitted this encryption operation to be realized are stored in the digital video stream in a part reserved for this purpose. The encryption of the reference images is sufficient to protect the content of the digital video stream because the rest of the digital video stream is composed of video image coded by compensation of movement from the reference video image stream. A double encryption operation is carried out, an encryption of the reference images by a first simple encryption function (application of an XOR or exclusive) then a complex encryption of the parameters of the first function by a second more complex encryption function. This double encryption allows the protection to be concentrated on the data quantity even less than the quantity that the reference images represent. The stream of video images coded by compensation of movement and the stream of reference video images (then protected) are then multiplexed to form the protected compressed video stream.

That system does not provide a separation into two streams. It describes a decomposition into two sets composed of reference video images and video images obtained by compensation of movement. Thus, the problem is to preserve the format of the digital video stream and bring about the protection a posteriori of the compression, which is not the case in US '538 in which it is clearly stated that the protection is made during the encoding of the video stream.

Finally, no analysis of the original digital stream is preformed in order to analyze the conformity of the data in it. Consequently, US '538 may render the protected digital video stream not in conformity with the standard from which it issued.

WO 03/007608 discloses protection of a digital video stream realized by an encryption method at the level of variable security.

The compressed video stream is divided into blocks with a fixed size. The protection is performed on these digital data blocks. The protection is performed on each block in turn. Only several bytes are encrypted in each block and the rest of the block remains unchanged. The choice of bytes to be protected is obtained by a pseudorandom generator or by a "look-up table". The byte selected can also be encrypted by using a "look-up table". Only three percent of each block has to be encrypted to obtain a satisfactory degradation of the compressed digital stream rendering it illegible for a standard rendering apparatus.

That system does not perform a separation into two compressed video streams, but performs its decomposition into blocks of a fixed size that are treated independently to encrypt some date of each block. The goal of that encryption operation is to render the compressed video stream illegible for a standard decoder.

It is currently possible to transmit audiovisual programs in digital form via broadcasting networks of the microwave, cable, satellite type, etc., or via telecommunication networks of the DSL (Digital Subscriber Line) or BLR (Loop Local Radio) type or via DAB networks (Digital Audio Broadcasting) as well as via any wireless telecommunication network of the GSM, GPRS, EDGE, UMTS, Bluetooth, WiFi type, etc. Moreover, to avoid pirating works broadcast in this manner, they are frequently encrypted or scrambled by various well-known means.

W. Zeng et al. published in the ACM Multimedia Proceedings of the International Conference in October, 1999 and titled "Efficient Frequency Domain Video Scrambling for Content Access Control" is also known for the area of encryption. That article describe a method of protecting digital data coding a multimedia content. The method is based on pseudorandom generators for generating three base pseudorandom operations (bit inversion, permutation and rotation of block of coefficients) that can be combined and controlled by encryption keys. The set of original data is present in the protected stream and access to the original content is entirely conditioned on possession or not of encryption keys. However, that solution does not use different modelings of pseudorandom generators nor data of the original stream such as a cryptographic key. Given that all the original data of the stream remains inside the protected stream, that method represents a classic encryption solution and, consequently, does not correspond to this disclosure.

Concerning the separation of an audiovisual stream into two parts in order to protect it, "Protecting VoD the Easier Way", Griwodz et al., Proceedings of the ACM Multimedia, September, 1998 describes a process of distribution via broadband networks or temporary servers and a point to point secure connection of protected multimedia content whose access is controlled and traced. The original auto visual stream is deliberately corrupted by a predetermined modification of certain bytes in the stream without any analysis of the structure and the content of the stream, therefore, without taking account of the conformity with the native format, which bytes are selected according to a predefined law (Poisson's law). A signal permitting reconstruction is transmitted subsequently to the client at the moment of viewing the content: A key is first communicated to the client that allows the client to recalculate emplacement of the corrupted bytes in the stream. Then, a signal containing the original bytes is sent to the client after encryption to reconstruct the initial stream. Reconstruction of the stream is thus conditioned by a simple key and consequently does not provide a high level of security.

SUMMARY

This disclosure relates to a process for distributing audiovisual sequences according to an original stream format having a succession of frames, analyzing the succession of frames of the original stream, prior to transmission to client equipment, to generate a modified main stream and complementary information, separately transmitting the modified main stream and the complementary information to equipment at an addressee, at least the modified main stream transmittal through a high throughput network and synthesizing a stream in the original format on a synthesis module at the addressee as a function of the modified main stream and the complementary information, wherein analyzing the original stream includes:

an operation application generating data comprising sequences of pseudorandom values with known parameters, extracting original data from the original stream as a function of the values of the pseudorandom sequences to produce a modified main stream, and storing data from the operation application and extracting in the complementary information.

The disclosure also relates to a system for producing an audiovisual stream, including at least one multimedia server containing original audiovisual sequences, an apparatus analysis of the audiovisual stream for separation of an original video stream into a modified main stream and into complementary information as a function of the analysis, at least one telecommunication network for transmission and at least one apparatus in the equipment of the addressee for reconstruction of the audiovisual stream as a function of the modified main stream and the complementary information.

The disclosure further relates to a process for distributing audiovisual sequences according to an original stream format having a succession of frames including:

performing modelings on the original stream to generate sequences of pseudorandom values with known parameters;

extracting original data as a function of pseudorandom sequences;

generating a modified main stream and complementary information;

storing at least one parameter from the modelings in the complementary information;

separately transmitting the modified main stream and the complementary information to an addressee; and synthesizing a stream in original format by equipment of the addressee as a function of the modified main stream and the complementary information.

BRIEF DESCRIPTION OF THE DRAWINGS

FIG. 2 schematically shows selected aspects of complementary information.

DETAILED DESCRIPTION

Figure 1:
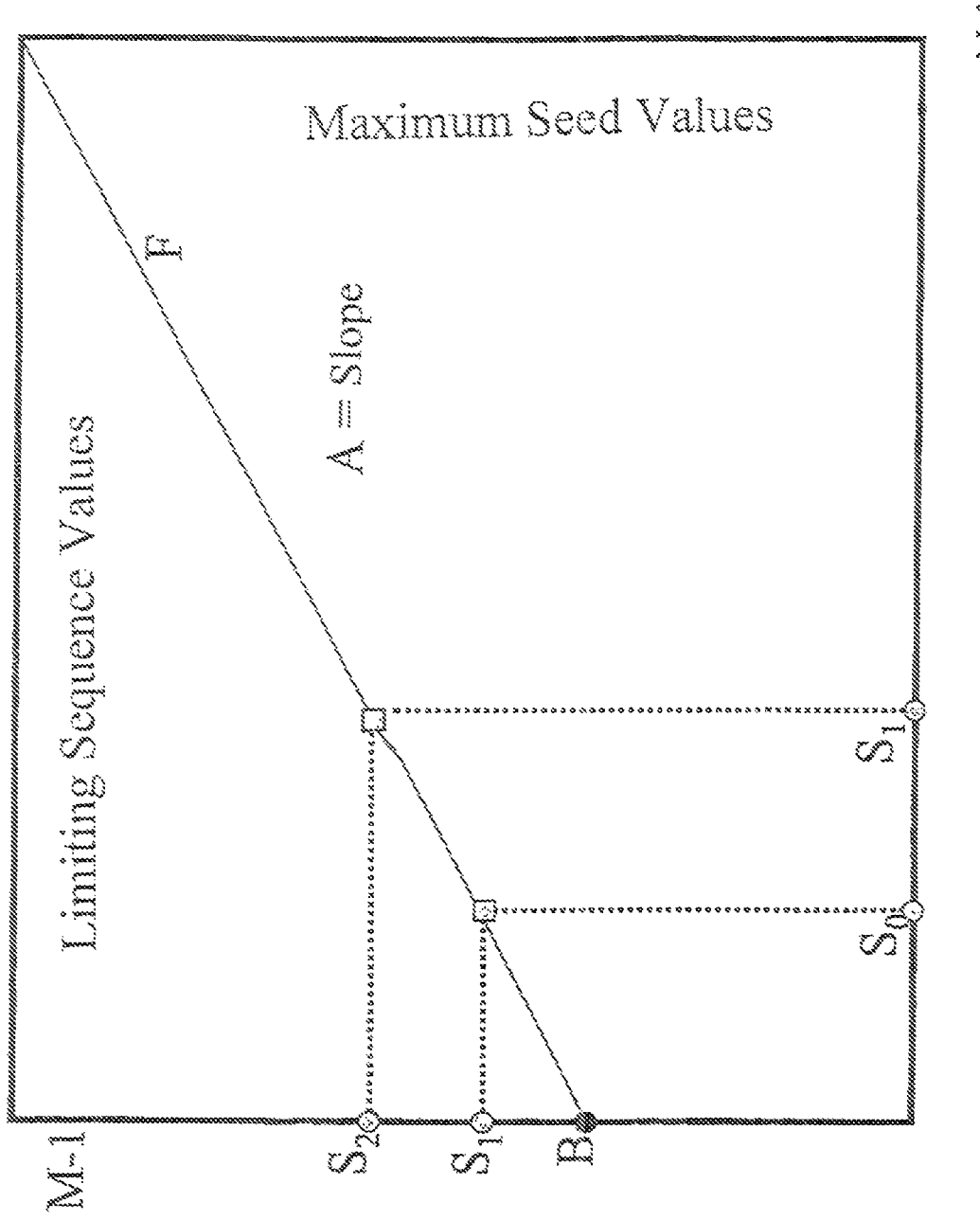
FIG. 1 graphically shows a pseudorandom generator.

The invention provides a process and a system that permit the visual and/or auditory protection of a digital audiovisual sequence issued from a digital compression standard or from a digital compression norm, the distribution in a highly secure manner of the sequence via a telecommunication network and reconstitution of its original content from a protected audiovisual stream on a recomposition module of the equipment of the addressee.

The invention relates more particularly to an apparatus capable of transmitting in a secure manner via a telecommunication network a set of high-quality audiovisual streams to a viewing screen and/or an audio output belonging to a terminal or to a display apparatus such as a television screen, a computer or even a mobile telephone, a mobile terminal of the PDA type (Personal Digital Assistant) or the like while preserving the audiovisual quality, but avoiding fraudulent use such as the possibility of making pirated copies of the broadcast contents.

We disclose a process and a client-server system that protects the audiovisual contents by separating them into two parts, which second part is indispensable for reconstitution of the original stream, the latter of which is restored as a function of the combination of the first part.

The process may separate the audiovisual stream into two parts in such a manner that the first part called the "modified main stream" contains the quasi-totality of the initial information, e.g., more than 99%, and a second part called "complementary information" containing targeted elements of the original information and that is of a very small size relative to the first part.

This disclosure also concerns modelings of pseudorandom processes used to define at which location and which modification will be applied, which modelings are a mathematical model describing a random natural phenomenon. These pseudorandom processes are initialized by different seeds. The random process generating the seeds is also modified dynamically by a set of parameters relative to its modeling during generation of the pseudorandom sequence.

These initialization seeds and modeling parameters are advantageously the data extracted from the original stream. The protection applied to the contents distributed by the secure system is advantageously based on the principle of deletion and replacement of certain information present in the encoded original audiovisual signal by any method such as: Substitution, modification, permutation or shifting of the information. This protection is also based on a knowledge of the structure of the digital stream. This solution extracts and permanently preserves in a secure server connected to the broadcasting and transmission network a part of the data of the audiovisual program recorded at the user's or directly broadcasted in this complementary information, which part is of prime importance for reconstituting the audiovisual program, but has a volume that is very small relative to the total volume of the digital audiovisual program recorded at the user's or received in real time by the user. The lacking part (the complementary information) will be transmitted via the secure network advantageously distributed by broadcasting or transmission at the moment of viewing and/or hearing of the audiovisual program. The data removed in the original audiovisual program is advantageously substituted to form the modified main stream by random or calculated data called decoys.

These initialization grains and modeling parameters are advantageously the data extracted from the original stream. The protection applied to the contents distributed by the secure system is advantageously based on the principle of deletion and replacement of certain information present in the encoded original audiovisual signal by any method such as: Substitution, modification, permutation or shifting of the information. This protection is also based on a knowledge of the structure of the digital stream. This solution extracts and permanently preserves in a secure server connected to the broadcasting and transmission network a part of the data of the audiovisual program recorded at the user's or directly broadcasted in this complementary information, which part is of prime importance for reconstituting the audiovisual program, but has a volume that is very small relative to the total volume of the digital audiovisual program recorded at the user's or received in real time by the user. The lacking part (the complementary information) will be transmitted via the secure network advantageously distributed by broadcasting or transmission at the moment of viewing and/or hearing of the audiovisual program. The data removed in the original audiovisual program is advantageously substituted to form the modified main stream by random or calculated data called decoys.

The fact of having removed and substituted with decoys a part of the original data of the original audiovisual stream during generation of the modified main stream does not permit restitution of the original stream only from the data of the modified main stream. The modified main stream may be totally compatible with the format of the original stream and can therefore be copied and read by a reader, but it is completely incoherent from the viewpoint of human visual and auditory perception. The modified main stream may have any format.

Once the digital stream is separated into two parts, the largest part, the modified main stream, is then transmitted via a classic broadcasting network whereas the lacking part, the complementary information, is sent on demand via a narrow band telecommunication network such as the classic telephone networks or cellular networks of the GSM, GPRS, EDGE or UMTS or by using a small part of a network of the DSL or BLR type, or by using a subset of the broadband shared on a cable network, or also via a physical support such as a memory card or any other support. In particular, the two networks can be combined while retaining the two separate transmission paths. The audiovisual stream is reconstituted on the addressee's equipment by a synthesizing module from the modified main stream and the complementary information sent piece by piece during use of the audiovisual stream.

The fact that the complementary information represents a quite small part of the original stream, e.g., 1%, allows it to be sent through networks with a low transmission rate. When the modified main stream has already been downloaded on the hard disk of the equipment of the addressee, the complementary information is preferably sent via a narrow band network. Complementary information with a low size facilitates its distribution on every type of network and contributes to reinforcement of security.

The disclosure further concerns an analysis module that implements a securing process in such a manner as to optimize the structure and content of the complementary information with the aid of different algorithms and modelings to minimize the size of the complementary information and to reinforce security.

The disclosure also concerns a process for distributing audiovisual sequences according to an original stream format constituted of a succession of frames, the original stream on which an analysis is made, prior to transmission to the client equipment, to generate a first modified main stream and complementary information, then the modified main stream and complementary information are transmitted separately to the equipment of the addressee, and for which a synthesis of a stream in the original format is calculated on the equipment of the addressee as a function of the modified main stream and the complementary information, which analysis of the original stream is constituted by:

an operation application stage comprising modelings generating sequences of pseudorandom values with known parameters, a stage for extraction of original data as a function of the pseudorandom sequences, and a stage for the storage of parameters of the modelings in the complementary information.

The parameters may be stored integrally in the complementary information. The parameters may also be stored partially in the complementary information.

The pseudorandom values advantageously represent information relative to at least one characteristic of the data extracted in the original stream. These pseudorandom values advantageously represent information relative to the position of the data extracted in the original stream. Furthermore, the parameters of the modelings are random.

The parameters of the modelings may be data extracted from the original stream. The modelings may be random.

The modelings are advantageously generated from at least one characteristic of the analysis equipment. The modelings are advantageously stored in the analysis equipment. The modelings used by the analysis equipment may be sent in advance by the equipment of the addressee. The modelings may also be stored in a smart card of the equipment of the addressee.

Synthesis of the original stream is preferably carried out as functions of the parameters of the modelings, reproducing the pseudorandom values obtained during the analysis stages.

Furthermore, the process is lossless.

We also disclose a system for implementation of the process, comprising at least one multimedia server containing the original audiovisual sequences, comprising an apparatus for analysis of the audiovisual stream for separation of the original video stream into a modified main stream and complementary information as a function of the analysis, at least one telecommunication network for transmission and at least one apparatus in the equipment of the addressee for reconstruction of the audiovisual stream as a function of the modified main stream and the complementary information.

The complementary information represents the set of data and information necessary for reconstruction of the original stream. It advantageously contains the original extracted values, their positions and information necessary for reconstruction, that are relative to the characteristics of the original data of the stream. However, in this instance, the information about the position of the original data have a size on the order of 50% of the complementary information. Compression of the complementary information proved to be ineffective on account of the fact that the positional information is statistically independent and therefore has a low redundancy. Moreover, the presence of voluminous positional information limits security all the more because there is so much original data that is not extracted, substituted by decoys and stored in the complementary information.

We reduce the amount of information contained in the complementary information concerning the original data and define it with the aid of modelings. In this manner, the information is reproduced during reconstitution of the original stream, the modelings and their parameters being known.

Representative, selected examples are described below with respect to modelings and algorithms of generators of pseudorandom sequences, initialized by random processes.

A random process is an, e.g., temporal signal s(t) for which the value can not be provided in advance whatever the considered instant. Such a process is generated either by using unforeseeable physical phenomena (such as the phenomena of the degradation of the atoms of radioactive elements) or by using pseudorandom processes coupled with random factors (such as an algorithm of the "wheel of fortune) type. Very complex (depending on phenomena not always mastered by one skilled in the art) and with constraints on the execution time that are too great on a computer, random processes are generally used in combination with pseudorandom processes. Random processes are used for modeling and initialization of pseudorandom generators.

A pseudorandom process is a deterministic process that allows generation of a sequence of numbers that possesses a distribution selected in a more or less uniform manner. These processes are initialized by a seed that serves as a starting point for the sequence. The advantage of pseudorandom processes is that they are rapid (short execution time for a computer) because they are issued from not very complex mathematical calculations. The quality of a pseudorandom generator is measured as a function of its period (number of minimal values that the sequence contains before reproducing itself identically) and the equidistribution that it will supply in several directions. An efficient pseudorandom generator has a long period and an equidistribution in a large number of direct actions.

An example of a pseudorandom generator of numbers (congruent linear pseudorandom generator) is described by the following expression, in which $S_n$ is the term of the sequence, M−1 the maximum value for the term $S_n$, and A and B are respectively the slope and the ordinate at the origin of a straight line F of the equation:

$$S_{n+1}=(S_n*A+B)\bmod(M).$$

The term $S_n$ represents in this case the seed maintained as follows:

seed=(seed*0x5DEECE66DL+0xBL) & ((1L<<48)−1;

$S_n$=seed

A=0x5DEECE66DL

B=0xBL mod(M)=& ((1L<<48)−1);

An example of a pseudorandom generator of numbers (congruent linear pseudorandom generator) is described by the following expression, in which $S_n$ is the term of the sequence, M−1 the maximal value for the term $S_n$, and A and B are respectively the slope and the ordinate at the origin of a straight line F of the equation:

$$S_{n+1}=(S_n*A+B)\bmod(M).$$

The term $S_n$ represents in this case the grain maintained as follows:

grain=(grain*0x5DEECE66DL+0xBL) & ((1L<<48)−1;

$S_n$=grain

A=0x5DEECE66DL

B=0xBL mod(M)=& ((1L<<48)−1);

This pseudorandom generator has a theoretical period of 2^48, the operation & ((1L<<48)−1) ensures the periodicity by rejecting any value greater than 2^48. Multiplier A is selected in such a manner that an oscillation is rapidly obtained.

FIG. 1 illustrates an example of a pseudorandom generator.

Successive values are generated from $S_0$ placed on the abscissa. The ordinate corresponding to the projection of $S_0$ on straight line F with slope A gives the value of the following grain $S_1$ on the ordinate, the value of which grain placed on the abscissa and projected from straight line F on the ordinate will give the value of the future grain $S_2$, and thus this iterative operation produces a sequence of grains.

When the grain is greater than or equal to the value $S_{max}=$ (M−B)/A, the rest of the entire division (the "modulo" function) of the value generated for $S_{max}$ divided by M is sent back to the generator to continue the sequence, result of the congruence of the modulo function.

Representative, selected examples are described in the following that implement modelings of congruent linear functions that produce pseudorandom values that are used during the analysis and synthesis.

The analysis performed to separate the original stream into a modified main stream and complementary information advantageously uses a large number of modelings of pseudorandom processes to guarantee a maximum of randomness and to thus furnish elevated security. This analysis is constituted of the following stages:

an operation application stage comprising modelings of pseudorandom processes, generating sequences of pseudorandom values with known parameters, a stage for extraction of the original data as a function of the pseudorandom sequences, a stage for introduction of the decoy data in place of the extracted original data, a stage for storage of the parameters of the modelings in the complementary information.

The protection process for each of the different digital formats has its own analysis algorithm constituted of the enumerated stages in guaranteeing an audiovisual degradation. Including the pseudorandom processes, the analysis ensures the uniqueness and effectiveness of the protection. It is at this moment of the process that the degree of security introduced into a stream is defined from the possible combinations generated by the pseudorandom process. The pseudorandom sequences generated during the analysis are advantageously used for:

Selecting the position of data to be extracted,
Selecting the number of data to be extracted for a given stream portion,
Selecting the size of the stream portion to be protected,
Selecting the number of portions to be protected,
Selecting the decoys and inserting them in place of the original data.

As concerns the evaluation of the degree of security introduced, the known AES ("Asymmetric Encryption System") protection process by encryption is taken as reference from the prior art. The key has a length of 128 bits and the number of possible combinations is therefore:

$2^{128}$=3.40e+8 possibilities of a key with 128 bits.

We pose the hypothesis that all the events are random, a stream portion with a length of 300 bytes is taken in which "n"=5 decoys, for example, is added, each of which decoys has a length of one byte. The following result is obtained: An account is taken of all the combinations of 5 bytes among 300, which makes 1.96e+12 possible words, knowing that there are $2^{40}$ binary words or 1.10e+12 possible words, and a total of 2.37e+34 possibilities are finally obtained. It was assumed that the number of decoys for realizing this calculation was known, namely, 5 decoys for a portion of 300 bytes. In the case in which the value of "n" would not be known, the total number of possibilities is obtained by summing the results for each of the "n" from 1 to 300, which produces a considerably augmented number of possibilities. With 300 decoys there is a combination of 300 bytes among 300 and $2^{2400}$ possible binary words, therefore, plus n (the number of decoys) is great the more the number of possibilities increases. However, the preceding hypothesis considers that all the samplings are random except in a real case of an analysis algorithm the sequences generated are pseudorandom, therefore, an ill-intentioned person could decide to search for the grain from which the pseudorandom sequence was generated. Knowing that the positions were generated by a grain of 32 bits over an interval of 300 values, this yields $2^{32}*256^5=4.73e+21$ possibilities for finding the values of the positions of the decoys (for a grain of 64 bits, 2.10e+31 possibilities are obtained, and likewise it is necessary to make the sum from 1 to 300 for each possible "n" in the portion described). In conclusion, it is easier for an ill-intentioned person to search for the grain than an exhaustive search of the positions of the decoys from the protected stream. However, when a grain coded for 128 bits is selected, the number of possibilities for the grain is identical to the number of keys possible for the AES method with a key coded for 128 bits.

Since an algorithm can not be composed solely of random processes as concerns rapidity of execution, the use of a pseudorandom generator becomes necessary for which generator a random seed is used that permits the desired security level to be fixed, e.g., by selecting a seed with a length of 128 bits. Likewise, a judicious choice of the parameters A, B, M and S.sub.0 is carried out in such a manner as to generate pseudorandom sequences with different types of distribution.

In this instance, a criterion for the evaluation of the security is the number of grains necessary for the process and the manner in which the sequences are generated.

The parameters A, B, M and $S_0$ for modeling the generator are advantageously selected randomly and remain unchanged for a portion of a given stream, e.g., for N consecutive bytes. At the end of this portion the parameters A, B, M and $S_0$ are modified, thus, reselected in a random manner. In this manner, the set of modeling parameters A, B, M and $S_0$ is changed every N bytes and N itself is advantageously random. The set of modeling parameters A, B, M and $S_0$ is preferably changed each time that the value $S_{max}$ is exceeded.

As concerns recomposition of the original stream during the synthesis on the equipment of the addressee, it is indispensable to recover the original values of the data extracted from the original stream and their placements in the stream. However, storing their true values and their placements in the complementary information produces complementary information containing much data that can be recalculated from the modeling parameters used during the analysis. Consequently, optimization of the size of the complementary information is performed by storing in the interior only the original extracted data and modeling parameters from which the positions and other characteristics of the original data are reproduced during the synthesis on the equipment of the addressee. Consequently, since the data relative to the original positions is on the order of 50% of the complementary information, the size of the complementary information is greatly reduced, all the while ensuring audiovisual degradation and increasing security because it furnishes the possibility of extracting more original data and of introducing more decoys.

The original data may be extracted without introduction of decoys in its place.

The analysis determining the characteristics of the data to be extracted is carried out taking three constraints into account:

The degradation of the content,

The security,

The transmission rate of the complementary information. Since the relationship between these three constraints is very complex, it is proposed to reduce the size of the complementary information without, however, reducing security and audiovisual degradation.

FIG. 2 represents the complementary information containing values generated by the modeling, namely, the positions P (FIG. 2a) and the original extracted data D. FIG. 2b represents the complementary information containing the modeling parameters S and the original extracted data D.

The complementary information preferably contains original data D. The modeling parameters or grains S from which these positions are generated are backed up in the place of positions P. The grains are advantageously data extracted from the original stream, thus guaranteeing high randomness or a combination of the data, which brings about an increase in the complexity of the chain between grains. For example, a grain is selected for the first position using a random process and a second grain combination of the first grain with the value of the extracted data is made for the second position of data to be extracted, and so forth. This operation guarantees for each random process a random re-initialization of the generator (the extracted value being random). A grain of 64 bits or 128 bits generated by a true random process is selected to avoid a portion of the protected stream from being compromised in the case that the first grain would be found. It proved to be difficult in this case to reconstitute the original positions since the positions are modeled from the grain in combination with the values of the original data of the stream.

The original content of the stream is restored from value S of the grain or the parameters or the model and the original data contained in the complementary information by the synthesis module that will reconstruct the original stream on the equipment of the addressee.

The complementary information is preferably specific to the analysis equipment that generates it with the aid of characteristics belonging to the equipment. Consequently, the complementary information will be freely broadcast because it can be interpreted solely by the analysis equipment or by other analysis equipment having exactly the same characteristics. The pseudorandom generator advantageously has a modeling belonging to the analysis equipment and/or relative to at least one characteristic belonging to the analysis equipment. The modeling may be stored in the analysis equipment. The modelings may also be stored in the equipment of the addressee. The modelings are advantageously stored in a smart card of the equipment of the addressee. The modelings of the equipment of the addressee are preferably sent to the analysis equipment for generation of complementary information personalized for the equipment of the addressee.

Figure 3:
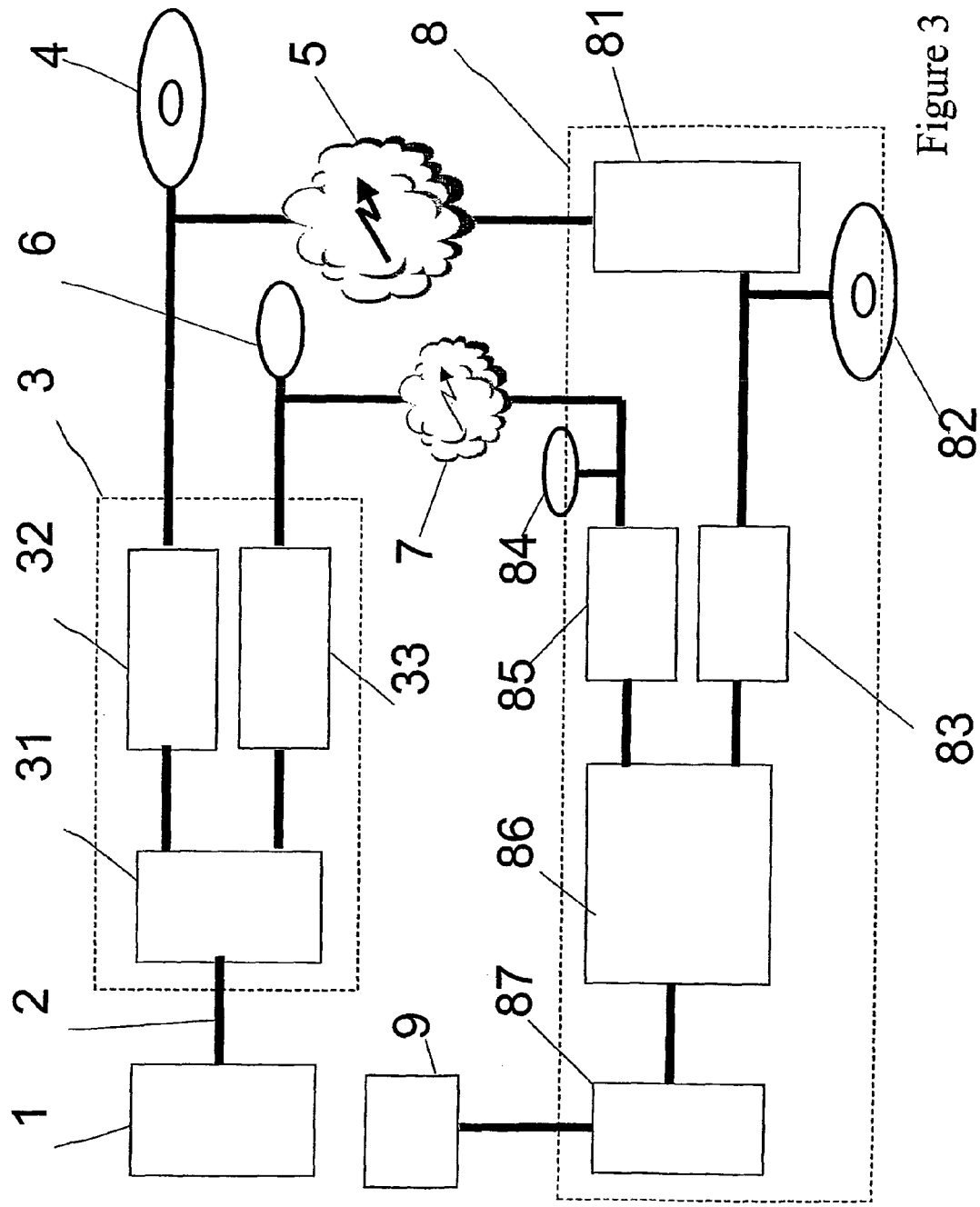
FIG. 3 schematically shows an example of a secure system for distributing audiovisual streams.

FIG. 3 shows a scheme with a purely explanatory description of a preferred client-server system for implementing the process.

Original audiovisual digital stream 1 to be secured is passed via a link 2 to analysis and protection module 31 that generates modified main stream 32 in a format advantageously identical to the format of input stream 1, aside from which certain original data was replaced by values different from the original ones and stored on server 3. The complementary information 33 in any format contains the values of the original data and the modeling parameters relative to the characteristics of the original modified, replaced, substituted or moved data. The complementary information 33 is also stored on server 3.

Modified main stream 32 is then transmitted via high-throughput network 5 of the microwave, cable, satellite type, etc., to the terminal of user 8 and stored in memory 81, that can be, e.g., a hard disk. When user 8 requests to view the audiovisual sequence present in memory 81, two things are possible: In the first instance, user 8 does not have all the rights necessary to view the audiovisual stream and in this instance audiovisual stream 32 generated by analysis module 31 present in memory 81 is passed to synthesis system 86 via reading buffer memory 83 that does not modify it and transmits it identically to a reader capable of decoding it 87, and its content, degraded visually and/or auditorily by scrambling module 31 is displayed on viewing screen 9.

In the second instance, server 3 decides that user 8 has the rights to view the audiovisual stream. In this instance, synthesis module 86 makes a viewing request to server 3 containing complementary information 33 necessary for recomposition of original sequence 1. Server 3 then sends complementary information 33 via telecommunication networks of the analog or digital telephone line type, DSL (Digital Subscriber Line) or BLR (Loop Local Radio) type, via DAB networks (Digital Audio Broadcasting) or via digital mobile telecommunication networks (GSM, GPRS, UMTS) 7, which permits reconstitution of the original audiovisual stream in such a manner that user 8 can store it in buffer memory 85. Network 7 can advantageously be of the same type as network 5.

Network 7 can advantageously be combined with network 5.

Synthesis module 86 then proceeds to the recomposition of the original audiovisual stream from the modified main stream that it reads in its reading buffer memory 83 and from the complementary information read in buffer memory 85 that permits it to recognize the positions as well as the original values of the modified data. The audiovisual stream reconstituted in the original format is sent to reader-decoder 87 corresponding to this format. The original reconstituted audiovisual stream is then displayed on viewing screen 9 of user 8.

Modified main stream 32 is advantageously passed directly via network 5 to reading buffer memory 83 then to synthesis module 86.

Modified main stream 32 is advantageously inscribed (recorded) on a physical support like a disk of the CD-ROM or DVD type, a hard disk or a memory card 4. Modified main stream 32 is then read from physical support 4 by reader 82 of box 8 to be transmitted to reading buffer memory 83, then to synthesis module 86.

Complementary information 33 is advantageously recorded on a physical support 6 with a credit card format constituted of a smart card or a flash memory card. This card 6 is then read by card reader 84 of the apparatus of user 8.

Card 6 advantageously contains the algorithms and the modelings of the generator of pseudorandom sequences that will be executed by synthesis system 86.

Apparatus 8 is advantageously an autonomous, portable and mobile system.

The invention claimed is:

1. A method of processing audiovisual sequences according to an original stream format having a succession of frames, comprising:
    analyzing the succession of frames of the original stream, using an analysis module, to generate a modified main stream and complementary information, wherein said analyzing comprises:
        generating one or more sequences of pseudorandom values with known parameters,
        extracting original data from the original stream and replacing extracted original data with replacement data as a function of the values of the one or more sequences of pseudorandom values, to produce a modified main stream, and
        storing in the complementary information data associated with at least one of the sequences of pseudorandom values and at least some of the extracted original data;
    separately forwarding the modified main stream and the complementary information to equipment at an addressee; and
    synthesizing a stream in the original format, using a synthesis module at the addressee, as a function of the modified main stream and the complementary information.

2. The method of processing according to claim 1, wherein all the data comprising the sequences of pseudorandom values and the extracted original data is stored in the complementary information.

3. The method of processing according to claim 1, wherein some of the data comprising the sequences of pseudorandom values and the extracted original data is stored in the complementary information.

4. The method of processing according to claim 1, wherein the pseudorandom values represent information relative to at least one characteristic of the original data extracted from the original stream.

5. The method of processing according to claim 1, wherein the pseudorandom values represent information relative to the position of the original data extracted from the original stream.

6. The method of processing according to claim 1, wherein at least some of the extracted original data is random.

7. The method of processing according to claim 1, wherein the data include original data extracted from the original stream.

8. The method of processing according to claim 1, wherein generating one or more sequences includes generating one or more sequences based on at least one characteristic of the analyzing.

9. The method of processing according to claim 1, further comprising storing one or more parameters related to the generating as a result of the analyzing.

10. The method of processing according to claim 1, further comprising forwarding one or more parameters related to the analyzing to the equipment at the addressee.

11. The method of processing according to claim 1, further comprising storing one or more parameters related to the generating in a smart card of the addressee.

12. The method of processing according to claim 1, wherein the synthesizing includes using said data reproducing the pseudorandom values obtained during the analyzing.

13. The method of processing according to claim 1, wherein the processing is lossless.

14. A system for transmitting an audiovisual stream, comprising analysis apparatus configured to analyze an original audiovisual stream for separation of the original audiovisual stream into a modified main stream and complementary information as a function of the analysis, where the analysis is based at least in part on at least one sequence of pseudorandom values, wherein the analysis comprises selecting data for extraction and replacement from the original audiovisual stream to obtain the modified main stream, and wherein the complementary information includes data extracted from the original audiovisual stream and data relating to the at least one sequence of pseudorandom values;
    and
    transmission apparatus configured to separately transmit the modified main stream and the complementary information to an addressee location, to permit reconstruction of the audiovisual stream as a function of the modified main stream and the complementary information.

15. A method for distributing audiovisual sequences according to an original stream format having a succession of frames, the method comprising:
    processing, in an analysis module, the original stream to generate sequences of pseudorandom values with known parameters, said processing including:

extracting original data as a function of the pseudorandom sequences;

generating a modified main stream, including substituting replacement data for original data extracted in said extracting, and complementary information, including at least a portion of the original data extracted in said extracting; and storing at least one parameter from the processing in the complementary information; and separately transmitting the modified main stream and the complementary information to an addressee to enable the addressee to synthesize a stream in the original format as a function of the modified main stream and the complementary information.

16. The system as recited in claim 14, wherein the analysis apparatus includes:

a generator to generate the at least one sequence of pseudorandom values, and an extractor responsive a sequence of pseudorandom values for extracting original data from original audiovisual sequences to produce said modified main stream and said complementary information.

17. The system as recited in claim 16, in which the extractor produces said complementary information comprising at least some of said extracted original data and at least one sequence of said pseudorandom values.

18. The system as recited in claim 16, in which the extractor produces said complementary information comprising all said extracted original data.

19. A method for recreating an original audiovisual sequence in an original stream format having a succession of frames, the method comprising:

separately receiving a modified main stream and complementary information at the recipient location, wherein the modified main stream and the complementary information are obtained by processing an original stream of the succession of frames using sequences of pseudorandom values with known parameters to extract data from the original stream as a function of the pseudorandom sequences, substituting replacement data for data extracted from the original stream to obtain the modified main stream, and wherein the complementary information includes at least some data extracted from the original stream and at least one parameter from the processing; and applying the modified main stream and the complementary information to a synthesis module to synthesize the original stream in the original format at the recipient location.

20. The method as recited in claim 19, in which said receiving includes receiving the modified main stream and the complementary information from a telecommunication network.

21. The method as recited in claim 19, in which said receiving includes receiving only the modified main stream from a telecommunication network and said complementary information is received from an information carrier.

22. The method as recited in claim 21, wherein said complementary information is received from a smart card.

23. A method of processing audiovisual sequences according to an original stream format having a succession of frames, for altering an original stream of the succession of frames, the method comprising:

analyzing the succession of frames of the original stream in an analysis unit configured to generate a modified main stream and complementary information, said analyzing comprising:

generating one or more sequences of pseudorandom values with known parameters, extracting original data from the original stream, and replacing extracted original data with replacement data, as a function of the values of the one or more sequences of pseudorandom values, to produce a modified main stream, and storing in the complementary information data associated with at least one of the sequences of pseudorandom values and at least some of the extracted original data; and separately forwarding the modified main stream and the complementary information to equipment at an addressee to permit reconstruction of the original stream by the equipment.

24. The method of processing according to claim 23, wherein all the data is stored in the complementary information.

25. The method of processing according to claim 23, wherein some of the data is stored in the complementary information.

26. The method of processing according to claim 23, wherein the pseudorandom values represent information relative to at least one characteristic of the data extracted from the original stream.

27. The method of processing according to claim 23, wherein the pseudorandom values represent information relative to the position of the data extracted from the original stream.

28. The method of processing according to claim 23, wherein at least some of the data is random.

29. The method of processing according to claim 23, wherein the data include data extracted from the original stream.

30. The method of processing according to claim 23, wherein the one or more sequences are data is generated from at least one characteristic of the analysis unit.

31. The method of processing according to claim 23, further comprising storing one or more parameters related to the generating, as a result of the analyzing.

32. The method of processing according to claim 23, further comprising forwarding one or more parameters related to the analyzing to the equipment at the addressee.

33. The method of processing according to claim 23, further comprising forwarding one or more parameters related to the generating for storage in a smart card of the addressee.

34. The method of processing according to claim 1, wherein said analyzing further comprises randomly selecting one or more parameter values used in generating the one or more sequences of pseudorandom values.

35. The method of processing according to claim 34, wherein said randomly selecting comprises randomly selecting the one or more parameter values on a periodic basis.

36. The method of processing according to claim 34, wherein the data associated with at least one of the sequences of pseudorandom values includes the at least one or more parameter values.

37. The system as recited in claim 16, wherein said generator is configured to randomly select one or more parameter values used to generate the at least one sequence of pseudorandom values.

38. The system as recited in claim 37, wherein the generator is configured to randomly select the one or more parameter values on a periodic basis.

39. The method of processing according to claim 37, wherein the data relating to the at least one sequence of pseudorandom values includes the at least one or more parameter values.

40. The method of processing according to claim 23, wherein said analyzing further comprises randomly selecting at least one of the known parameters.

41. The method of processing according to claim 40, wherein said randomly selecting comprises randomly selecting the at least one of the known parameters on a periodic basis.

42. The method of processing according to claim 40, wherein the data associated with at least one of the sequences of pseudorandom values includes at least one of the known parameters.

43. A method of distributing an original audiovisual stream, the method comprising:

analyzing the audiovisual stream to generate a modified audiovisual stream and complementary data, said analyzing including:

generating at least one sequence of pseudorandom values using one or more known, randomly-selected parameter values; and processing, in a signal processing device, the original audiovisual stream using the at least one sequence of pseudorandom values to select data to extract from the original audiovisual stream and to replace with replacement data to obtain the modified audiovisual stream, said processing further generating the complementary data, wherein the complementary data includes at least a portion of the data extracted from the original audiovisual stream and information to permit reconstruction of the original audiovisual stream based on the modified audiovisual stream and the complementary information.

44. The method according to claim 43, further comprising: periodically randomly-selecting at least one of the randomly-selected parameter values.

45. The method according to claim 43, wherein the information to enable reconstruction includes at least one of the randomly-selected parameter values.

* * * * *